June 5, 1956
G. HERZOG
2,749,446
PROSPECTING
Filed July 23, 1951
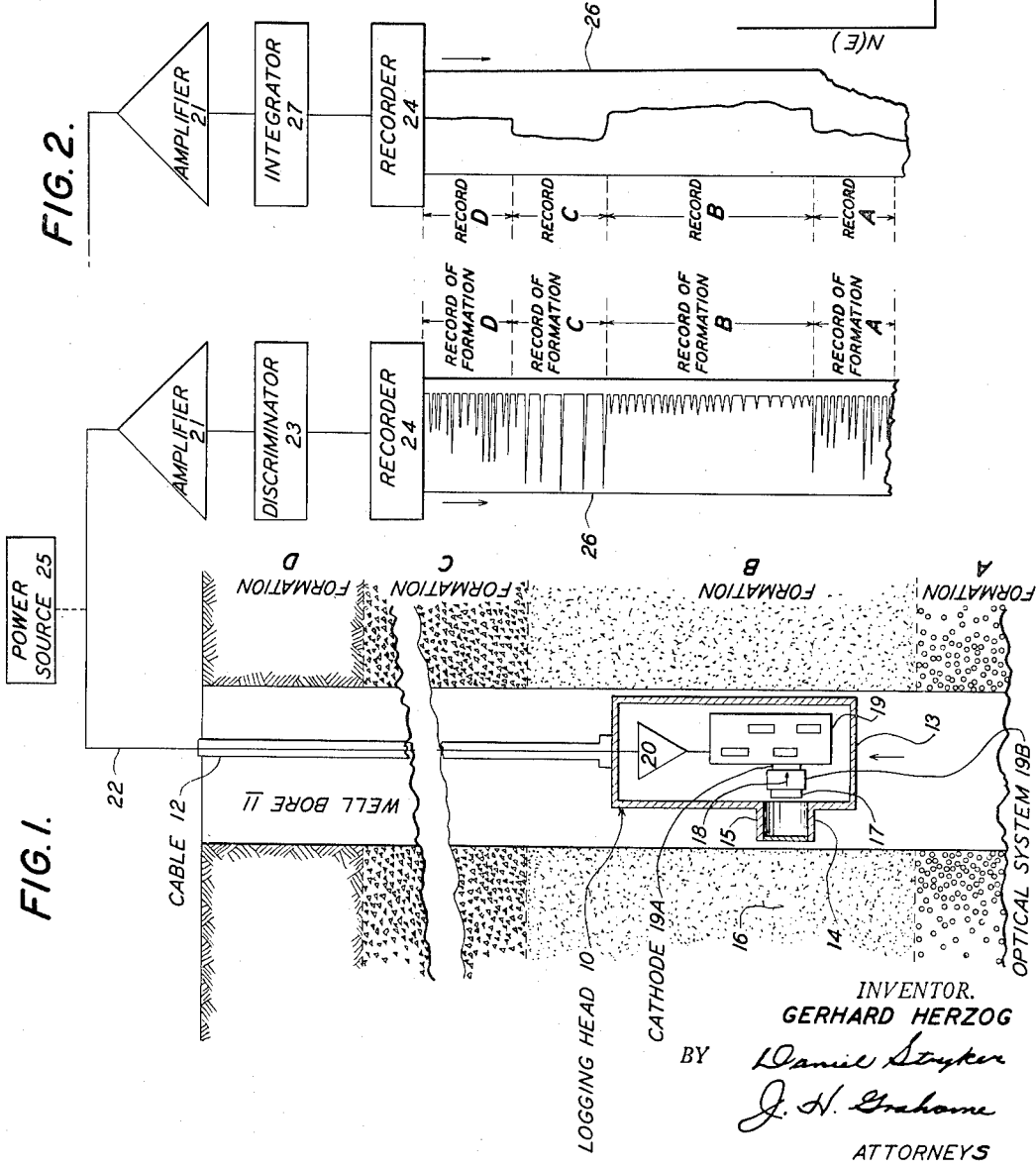
INVENTOR.
GERHARD HERZOG
BY
ATTORNEYS

United States Patent Office 2,749,446
Patented June 5, 1956

2,749,446
PROSPECTING

Gerhard Herzog, Houston, Tex., assignor to The Texas Company, New York, N. Y., a corporation of Delaware Application July 23, 1951, Serial No. 238,038

10 Claims. (Cl. 250—71)

This invention is concerned with geophysics and particularly with operations involving the detection and measurement of gamma rays emitted by earth or earth samples. The invention finds application in the location of mineral deposits, but is of general utility in distinguishing between geological formations and in locating faults, contacts and other discontinuities of the earth's crust. Thus it is useful in gamma ray logging of wells, in surveys made above ground for geological mapping purposes and in underground surveys of mine workings for the location and delineation of mineral deposits.

As disclosed in my co-pending application, Serial No. 13,847, filed March 9, 1948 (now Patent No. 2,563,333), the investigation of the spectra of gamma radiation emitted by rocks or rock samples, as well as the intensity of such radiation, may be useful in locating strata penetrated by a bore in the earth and in finding buried mineral deposits.

Gamma radiation consists of electromagnetic waves identical in nature to very penetrating X-rays. Gamma rays are emitted by radio-active substances with different individual energies, i. e. wave lengths, and each radio-active substance has a characteristic gamma ray spectrum composed of gamma radiation of different energies (wave lengths). Radioactive substances are distributed throughout many of the rocks of the earth's crust in minute concentrations but these concentrations are sufficient to permit detection, measurement of radiation intensity, and determination of the spectra of the gamma rays emitted. Gamma ray intensity varies from formation to formation, and even when the intensities (say counts per unit time) of the gamma rays emitted by two formations are substantially the same, so that no differentiation between the two can be made by intensity measurements, such differentiation is often possible because of a difference in the energy of the emitted gamma rays. By way of example, the gamma radiation from shale having a high potassium content may have a spectrum entirely different from the gamma radiation emitted by a sandstone in which the source of the radiation is a heavy radioactive element such as uranium, and yet the intensity of emitted radiation in the two cases may be the same.

I have developed a new method and novel apparatus for detecting differences in the spectra of gamma rays emitted by different earth formations, either in situ (as in well logging) in which the rock remains in place and the apparatus is moved along the course of the survey, or with samples of the rock, for example cuttings from a well bore, which are subjected to examination in the laboratory. In accordance with the invention, the gamma rays emitted from the rock are caused to impinge upon a substance, say a crystal of sodium iodide (activated with a small proportion of thallium), which scintillates upon gamma ray bombardment, with the production of photons. The nature of the substance is such that the number of photons produced in unit time is a function of the intensity of the impinging gamma radiation. Moreover, the nature of the substance is such that, if these photons are converted into electrons with a photomultiplier, each detected gamma ray produces an electron pulse whose amplitude is a function of the energy of that gamma ray. By measuring the amplitude of the individual pulse or the average amplitude of a group of pulses, it is possible to distinguish between formations whose gamma ray emissions have different spectra. Since the number of pulses is a measure of gamma ray intensity and the amplitude of pulses is a measure of gamma ray energy it is possible, by determining both, to obtain simultaneous indications of both intensity and spectrum.

In further explanation of the invention, it should be pointed out that when a gamma ray impinges on a crystal of the type contemplated here, it either passes through undisturbed (in which case it cannot be detected) or else it interacts with the crystal, losing a part or all of its energy to the crystal in the process. The three types of gamma ray interaction are the photo-electric effect, the Compton effect and pair production. The end effects of all of these are similar in that a large portion of the gamma ray energy is transferred to electrons which move through the crystal with relativistic velocities at first, and leave behind them trails of ionized atoms until all the electron energy is dissipated. The ranges of these electrons are usually less than a fraction of a centimeter when they are caused by naturally occurring gamma rays and are thus much smaller than the dimensions of the large crystals now available for scintillation counting. This means that the electrons can dissipate all their energy in the crystal which then gives off a certain portion of this energy as photons. These photons are then in turn detected by a photomultiplier.

The energy distribution of the photons depends on the crystal and is usually a band several hundred Angstroms in width. The photon energy distribution does not depend on the energy of an incident gamma ray but the number of photons emitted will in general be larger for an interaction involving a higher energy gamma ray. This in turn gives a larger pulse from the photomultiplier. In fact, the photon production rate is roughly proportional to the sum over all energy intervals of the products of the number of gamma rays in a particular energy interval multiplied by that energy. This is written in mathematical terms by saying $$\text{Photon production rate } \alpha \int_0^\infty E \times N(E) dE$$

where $N(E)$ $dE$ is the number of bamma rays falling in the energy interval between E and $E+dE$.

In addition, when the pulses are fed into an integrating circuit, its output will be proportional to the photon production rate. Thus, through reference to the accompanying Fig. 3, the integrator output will be larger if the gamma ray spectrum is like curve A in Fig. 3 than if the spectrum is like curve B, even though the areas under the curves are the same—thus indicating the same gamma ray intensity.

The difference may be made still greater by setting a discriminator such that all pulses smaller than those corresponding to energy $E_0$ are rejected. The response to the energy spectrum B is then considerably reduced while the response to A remains unchanged.

It has been common heretofore, for example in X-ray photography, to employ screens which fluoresce under the action of X or gamma rays. These screens take the form of plates coated with zinc sulphide and other substances. However, such screens are not suitable for the practice of the instant invention because they do not permit a photosensitive device to produce pulses proportionate in energy to the activating rays. On the contrary, crystals of sodium iodide, activated with thallium, do permit such pulse production and are suitable for use in the invention. They are available in adequate sizes, and in fact, up to 2½ inches in diameter and several inches long. Other suitable crystals include anthracene and calcium tungstate, which like thallium-activated sodium iodide are translucent to their own luminescent photons.

These and other aspects of the invention will be understood in the light of the following detailed description, taken in conjunction with the accompanying drawing, in which:

Fig. 1 is a diagram illustrating the application of the invention to well logging;

Fig. 2 illustrates a modification of the apparatus of Fig. 1, like parts being indicated by like reference characters; and Fig. 3 is the explanatory graph already referred to.

The apparatus of Fig. 1 comprises a logging head 10 which is drawn up a well bore 11 at a constant rate by means of an attached cable 12 and conventional hoisting equipment (not shown). The logging head comprises a case 13 having walls of thick dense metal, such as lead or steel, which are impervious to alpha and beta radiation and to all but extremely energetic gamma rays. The case has a thin window 15 which is opaque to light and to alpha and beta rays but transparent to substantially all gamma rays 16 emitted from the adjacent rock which forms the wall of the well bore. If desired, this window may be mounted on the outer end of a collimating tube 14, which has walls like that of the case and projects from its side.

The gamma rays are collimated in the tube and impinge upon a crystal 17 of thallium-activated sodium iodide disposed near the inner end of the tube. Upon impingement, the gamma rays cause the crystal to emit photons 18 which in turn impinge upon the cathode 19A of a conventional photomultiplier tube 19. If desired, a conventional optical system, 19B, either lens or mirror, may be inserted between the crystal and the cathode to concentrate a beam of the photons on the cathode. However, for good light gathering efficiency it is desirable to have the photosensitive surface of the photomultiplier as close to the crystal as possible, a condition that can be attached by eliminating the optical system and placing the glass envelope of the tube in direct contact with the crystal. Each impinging photon causes a cascade of electrons in the photomultiplier tube. This appears as an electrical pulse at the output of the tube. The number of such pulses corresponds to the number of gamma rays detected by the apparatus. The amplitude of each pulse corresponds approximately to the energy of the gamma ray which caused it.

The output of the photomultiplier tube is sent to an electronic preamplifier 20 of conventional type, such for example as that used in gamma ray logging with pulse type counters of the Geiger-Mueller type. Conveniently the preamplifier is disposed in the logging head adjacent the photomultiplier tube. The preamplifier is connected to an electronic amplifier 21 at the surface of the ground through a lead 22 which is enclosed in the cable. In the amplifier, the pulses are further amplified so that they may be recorded as traces against time. If the logging head is passed along the bore at a constant rate, such a record is also a plot of the pulse against the corresponding positions of the logging head in the well.

If desired, the output of the amplifier may be passed through a conventional discriminator 23 prior to entering the recorder 24. The discriminator is, in effect, an adjustable filter which passes only pulses of a predetermined amplitude and may be employed to exclude "hash," i. e. spurious pulses of low amplitude which do not represent detected gamma radiation and which would only confuse the record if they were permitted to appear. As previously indicated, the discriminator may also be employed to emphasize differences in energy of detected gamma radiation. A suitable amplifier-discriminator is disclosed in U. S. Patent No. 2,541,341.

The photomultiplier tube, preamplifier, amplifier, discriminator and recorder are energized in conventional fashion by a power source 25.

The recorder is provided with a chart 26 which is driven at constant speed, or if the speed of the logging head in the well is variable then at corresponding varying speed. A conventional recording oscillograph such as that employed in recording mass spectrometers is suitable. The pulses corresponding to detected gamma rays appear in sequence on the record. The frequency of appearance of the pulse is a measure of the intensity of the detected gamma radiation. The amplitude of the pulses is a measure of the energy of the detected gamma radiation. By way of example, formation B in the well bore, when traversed by the logging head, produces a record consisting mainly of relatively short pulse occurring in rapid sequence. Formation C on the other hand, reveals its difference from formation B by producing much longer pulses occurring in much slower sequence. There are therefore, two bases for detecting a difference between strata traversed by the well. In instances when the intensities of detected radiation from adjacent strata are the same or confusingly similar, the two may be distinguished from each other on the basis of peak heights. In instances when the spectra of detected radiation from adjacent strata are the same or confusingly similar, the strata may be distinguished from each other on the basis of peak frequency.

As shown in Fig. 2, an integrator 27, say a tank circuit, may be connected between the discriminator and the record, or between the amplifier and the recorder if the discriminator is eliminated. The effect of the integrator is to average out the pulses both with respect to amplitude and frequency. This produces a record in the form of a continuous curve instead of a series of peaks. Such a record has the advantage of easy interpretation and is useful except in cases in which the averaging effect obscures the difference between formations. In the record of Fig. 2, the averaging does not prevent the observer from distinguishing between formations, but it will be readily apparent that this result could occur.

The gamma rays which may be subjected to spectrum analysis in the practice of the invention may be produced either by natural or by induced radiation.

The apparatus of the invention is not limited in its utility to well logging. By way of example, the apparatus of Fig. 1, with little modification, can be used for geophysical surveys across an earth surface or underground along a drift, cross cut or shaft. In such cases, the logging or detector head is directed so that gamma radiation from the earth enters the window and records are made in the same fashion as in well logging.

If desired, in either well logging or surface surveys, the detector head may be held stationary at any observation point so as to obtain a more exact measure of gamma ray energy or intensity or both at that point, or moved continuously along a traverse as already described.

In surface surveys, the apparatus may be carried along the traverse close to the ground by man, animal or vehicle, or it may be airborne, after the fashion described in my co-pending application Serial No. 13,847, filed March 9, 1948 (now Patent No. 2,563,333).

The apparatus of the invention may also be employed in the examination of rock samples. In such case the detector head is kept stationary, say in a laboratory, and rock or earth samples are disposed in front of the window so that the emitted gamma radiation impinges upon the crystal.

In addition to the various types of crystals described herein as photosensitive elements in the practice of the invention, it is also possible to employ phosphor elements of the type described and claimed in U. S. Patent No. 2,559,219, granted July 3, 1951.

The recorders employed in the practice of the invention may be of the magnetic type, with the record formed on an elongated magnetizable element such as a tape or wire. A suitable magnetic recording device for this purpose is disclosed in application Serial No. 151,662, filed March 24, 1950, by Herzog, Lord and Pancake.

In some instances it may be desirable to cool the photomultiplier tube to minimize so-called dark light or background. This may be done conveniently with a refrigerant such as Dry Ice disposed in the logging head.

I claim:

1. In apparatus for investigating gamma spectra of formations penetrated by a well bore, the combination which comprises a logging head adapted to be drawn along a well bore, a photomultiplier tube provided with a cathode mounted in the logging head, a body which upon bombardment with gamma rays produces electrons which move through the body and cause it to emit photons, said body being translucent to its own luminescent photons and so large that the electrons dissipate substantially all of their energy therein and being disposed in the logging head in a position such that the photons impinge upon the cathode, and means for indicating the amplitude of the resulting electrical pulses produced at the output of the photomultiplier tube.

2. Apparatus according to claim 1 provided with a shield disposed around the body that is opaque to light, alpha and beta rays and to gamma rays of low energy, and a window in the shield adjacent the body, said window being transparent to gamma rays of higher energy but opaque to light, alpha and beta rays.

3. In apparatus for investigating the spectrum of gamma rays emitted by earth the combination which comprises a photomultiplier tube provided with a cathode, a body disposed adjacent the cathode and capable, upon bombardment with gamma rays, of producing electrons that move through the body and cause it to emit photons, the body being translucent to its own luminescent photons and the size of the body being such that substantially all of the energy of the electrons is dissipated in the body, the disposition of the body being such that the photons impinge upon the cathode, means for shielding the body from light and alpha and beta rays but permitting the passage of gamma rays to the body, and means for observing the amplitude of pulses produced at the outlet of the photomultiplier tube due to impingement of the photons upon the cathode.

4. Apparatus according to claim 3 provided with an amplifier connected to the output of the photomultiplier tube, and means for recording the amplitudes of the individual amplified pulses.

5. Apparatus according to claim 3 provided with means for recording the amplitudes and number of the individual pulses.

6. Apparatus according to claim 3 provided with a discriminator connected to the output of the photomultiplier tube for suppressing pulses having less than a predetermined amplitude.

7. In a geophysical method involving the detection of gamma rays emitted by earth, the improvement which comprises causing the gamma rays to impinge upon a body which produces electrons upon gamma ray bombardment and which in turn produce photons, the body being translucent to its own luminescent photons causing substantially all of the energy of the electrons to be dissipated in the body, causing the photons by electron cascade to produce electrical pulses having amplitudes roughly proportional to the energy of the activating gamma rays, and measuring the amplitude of the pulses.

8. In a geophysical method involving the detection of gamma rays emitted by earth, the improvement which comprises causing the gamma rays to impinge upon a body which produces electrons upon gamma ray bombardment and which in turn produce luminescent photons to which the body is translucent, causing substantially all of the energy of the electrons to be dissipated in the body, causing the photons by electron cascade to produce electrical pulses having amplitudes roughly proportional to the energy of the activating gamma rays, integrating a group of the pulses, and measuring the average amplitude of the integrated group.

9. In a geophysical method involving the detection of gamma rays emitted by earth, the improvement which comprises causing the gamma rays to impinge upon a body which produces electrons upon gamma ray bombardment and which in turn produce luminescent photons to which the body is translucent, causing substantially all of the energy of the electrons to be dissipated in the body, causing the photons by electron cascade to produce electrical pulses having amplitudes roughly proportional to the energy of the activating gamma rays, eliminating all of the pulses having less than a predetermined amplitude, integrating a group of the remaining pulses and measuring the average amplitude of the integrated group.

10. In a geophysical method involving the detection of gamma rays emitted by earth, the improvement which comprises causing the gamma rays to impinge upon a body which produces electrons upon gamma ray bombardment and which in turn produce luminescent photons to which the body is translucent, causing substantially all of the energy of the electrons to be dissipated in the body, causing the photons by electron cascade to produce electrical pulses having amplitudes roughly proportional to the energy of the activating gamma rays, and measuring both the amplitude and rate of occurrence of the pulses.

References Cited in the file of this patent

UNITED STATES PATENTS

| | | |
|---|---|---|
| 2,351,028 | Fearon | June 13, 1944 |
| 2,378,408 | Herzog | June 19, 1945 |
| 2,493,346 | Herzog | Jan. 3, 1950 |
| 2,508,772 | Pontecorvo | May 23, 1950 |
| 2,517,404 | Morton | Aug. 1, 1950 |
| 2,534,932 | Sun | Dec. 19, 1950 |
| 2,590,057 | Wiegand | Mar. 18, 1952 |
| 2,648,012 | Scherbatskoy | Aug. 4, 1953 |
| 2,659,011 | Youmans | Nov. 10, 1953 |